United States Patent [19]
Kidokoro et al.

[11] Patent Number: 5,674,145
[45] Date of Patent: Oct. 7, 1997

[54] SHIFT CONTROL SYSTEM FOR TROIDAL CONTINUOUSLY VARIABLE TRANSMISSION

[75] Inventors: Hitoshi Kidokoro; Itsuro Muramoto, both of Yokosuka, Japan

[73] Assignee: Nissan Motor Co., Ltd., Yokohama, Japan

[21] Appl. No.: 636,660

[22] Filed: Apr. 23, 1996

[30] Foreign Application Priority Data

Apr. 24, 1995 [JP] Japan .................. 7-098323

[51] Int. Cl.$^6$ ........................................ F16H 15/04
[52] U.S. Cl. ..................................... 475/192; 475/3
[58] Field of Search .................. 475/186, 192; 476/2, 3

[56] References Cited

U.S. PATENT DOCUMENTS

| | | | |
|---|---|---|---|
| 2,958,234 | 11/1960 | Oehrli | 475/186 |
| 4,434,675 | 3/1984 | Kraus | 74/200 |
| 4,744,032 | 5/1988 | Miyaura et al. | 477/50 |
| 4,963,122 | 10/1990 | Ryan | 475/186 |
| 5,042,326 | 8/1991 | Hibi et al. | 477/50 |
| 5,099,719 | 3/1992 | Hibi et al. | 477/50 |
| 5,136,890 | 8/1992 | Hibi et al. | 74/190.5 |
| 5,136,891 | 8/1992 | Nakano . | |
| 5,144,850 | 9/1992 | Hibi . | |
| 5,178,043 | 1/1993 | Nakamo | 475/192 |
| 5,187,995 | 2/1993 | Nakano . | |
| 5,238,460 | 8/1993 | Esaki et al. | 475/192 |
| 5,286,240 | 2/1994 | Kobayashi . | |

*Primary Examiner*—Dirk Wright
*Attorney, Agent, or Firm*—Foley & Lardner

[57] ABSTRACT

A shift control system for a troidal continuously variable transmission, which serves to return power rollers to an initial position by returning a shift control valve to a neutral position through feedback of a power roller tilting angle to the shift control valve via a mechanical feedback system, comprises an electronic feedback system for feeding back, for calculation of a shift command value, a deviation of a speed ratio from a target speed ratio corresponding to a target tilting angle in accordance with a predetermined gain, and a mechanical feedback function cancellation system for canceling, for calculation of the shift command value, the function of the mechanical feedback system through electronic feedback of the power roller tilting angle as detected in accordance with a gain equivalent to that of the mechanical feedback system.

7 Claims, 8 Drawing Sheets

SHIFT CONTROL SYSTEM FOR TROIDAL CONTINUOUSLY VARIABLE TRANSMISSION

BACKGROUND OF THE INVENTION

The present invention relates generally to a troidal continuously variable transmission and more particularly, to its shift control system.

Generally, a troidal continuously variable transmission comprises, as disclosed, for example, in U.S. Pat. No. 4,434,675 to Kraus and U.S. Pat. No. 5,136,890 to Hibi et al., a troidal transmission unit including input and output discs and power rollers frictionally engaged with the input and output discs to ensure power transmission therebetween, and a shift control system.

The shift control system comprises an actuator or a stepper motor which is driven, in response to a shift command value or a step number corresponding to a target speed ratio, to a corresponding position, by which an outer valve element of a shift control valve is displaced from a neutral position relative to an inner valve element thereof so as to open the shift control valve. This makes the power rollers be offset by y as will be described in detail in connection with the preferred embodiment, which produces tilting of the power roller by $\phi$. Thus, the diameter of a circle formed between two contact points of each power roller with respect to the input and output discs is continuously varied to ensure continuous shifting.

It is known that the shift control system for a troidal continuously variable transmission provided with a mechanical feedback system comprising a precess cam and a shift link has a transient characteristic of shifting which is given by the following formula when considering only a feedback of the power roller tilting angle $\phi$. It is noted that a feedback of the power roller offset amount y is not discussed here due to its irrelevance to the present invention.

$$d\phi/dt = y\cos(\theta-\phi)\cdot[1+\eta-\cos(2\theta-\phi)]\cdot N_o/(1+\eta)\cdot R\cdot\sin\theta \quad (1)$$

wherein $\theta$, $\eta$, and R are constants determined by the structure of the transmission, and $N_o$ is a revolution of the output disc.

When applying a linear approximation, the formula (1) is expressed as follows:

$$d\phi/dt = K\cdot N_o\cdot y \quad (2)$$

wherein K is a constant.

When a feedback gain of the mechanical feedback system is a, and a target tilting angle is $\phi_o$, y is given by a formula:

$$y = a(\phi_o - \phi) \quad (3)$$

With this, the formula (2) is expressed as follows:

$$d\phi/dt = K\cdot N_o\cdot a(\phi_o - \phi) \quad (4)$$

Here, if $N_o$ is treated as constant, the following formula can be obtained:

$$\phi = \phi_o + e^{-KaN_o t} \quad (5)$$

Thus, the shift control system for a troidal continuously variable transmission provided with such known mechanical feedback system produces a problem that the transient characteristic of shifting is varied with the revolution $N_o$ of the output disc or the vehicle speed. This influences largely an acceleration performance of a motor vehicle mounted with the troidal continuously variable transmission, resulting in occurrence of a grave problem that the acceleration performance is varied with the vehicle speed.

On the other hand, if the mechanical feedback system ensures a feedback of the power roller tilting angle $\phi$ given by the following formula in place of the formula (3):

$$y = b(\phi_o - \phi)/N_o \quad (6)$$

wherein b is a feedback gain, i.e., a feedback of the power roller tilting angle $\phi$ with a gain $b/N_o$ proportional to an inverse number of the output disc revolution $N_o$, the following formulae are obtained:

$$d\phi/dt = K\cdot b\cdot(\phi_o - \phi) \quad (7)$$

$$\phi = \phi_o + e^{-Kbt} \quad (8)$$

Thus, the same characteristic of shifting can be maintained irrelevant to the output disc revolution $N_o$, i.e. over all vehicle speed area.

However, it is very difficult, or rather practically impossible to manufacture the mechanical feedback system which ensures a feedback of the power roller tilting angle $\phi$ with the gain $b/N_o$ proportional to an inverse number of the output disc revolution $N_o$.

One of solutions is to arrange an electronic feedback system to the troidal continuously variable transmission with the mechanical feedback system completely removed, by which the power roller tilting angle $\phi$ is fed back with a gain proportional to an inverse number of the output disc revolution $N_o$. Simultaneously, the shift command value is supplied to the actuator in accordance with a deviation of the power roller tilting angle $\phi$ from the target tilting angle $\phi_o$, so as to make the power roller tilting angle $\phi$ conform to the target tilting angle $\phi_o$. In that case, the characteristic of shifting can be achieved irrelevant to the output disc revolution $N_o$ or the vehicle speed as seen in the formula (8).

However, since the electronic feedback system is not as reliable as the mechanical feedback system, the shift control system which ensures a feedback of the power roller tilting angle $\phi$ by only the electronic feedback system is not preferable in view of fail safe.

Conclusively, it is recommendable to add the electronic feedback system to the troidal continuously variable transmission with the mechanical feedback system being kept for fail safe. When adding the electronic feedback system to the troidal continuously variable transmission with the mechanical feedback system having a constant feedback gain being kept, however, as seen from the fact that y is given by the following formula corresponding to the formulae (3) and (6):

$$y = a(\phi_o - \phi) + (b/N_o)(\phi_o - \phi) \quad (9)$$

and $d\theta/dt$ is given by the following formula corresponding to the formulae (4) and (7):

$$d\phi/dt = K\cdot N_o\cdot a(\phi_o - \phi) + K\cdot b(\phi_o - \phi) \quad (10)$$

and $\phi$ is given by the following formula corresponding to the formulae (5) and (8):

$$\phi = \phi_o + e^{-(KaN_o - KB)t} \quad (11)$$

the characteristic of shifting cannot be achieved irrelevant to the output disc revolution $N_o$ or the vehicle speed, resulting in no sense in adding the electronic feedback system.

It is, therefore, an object of the present invention to provide a shift control system for a troidal continuously variable transmission of which the characteristic of shifting is not varied with the vehicle speed.

SUMMARY OF THE INVENTION

According to one aspect of the present invention, there is provided a shift control system for a troidal continuously variable transmission provided with input and output discs and power rollers frictionally engaged with the input and output discs for ensuring power transmission therebetween, the shift control system serving to make, by opening a shift control valve in a neutral position in accordance with a shift command value, the power rollers be offset with respect to a position wherein a rotation axis thereof and a rotation axis of the input and output discs cross each other so as to produce tilting of the power rollers about an oscillating axis perpendicular to the rotation axis thereof and toward a target tilting angle corresponding to the shift command value, the shift control system serving to return the power rollers to the position by returning, when achieving the target tilting angle, the shift control valve to the neutral position through feedback of a tilting angle of the power rollers to the shift control valve via a mechanical feedback system, the shift control system comprising:

means for detecting a revolution of the output disc;

means for detecting a physical quantity indicative of a speed ratio of the troidal continuously variable transmission;

an electronic feedback system arranged to feed back, for calculation of the shift command value, a deviation of said physical quantity from a target value thereof corresponding to the target tilting angle in accordance with a predetermined gain;

means for detecting the tilting angle of the power rollers; and a mechanical feedback function cancellation system arranged to cancel, for calculation of the shift command value, a function of the mechanical feedback system through electronic feedback of the tilting angle as detected in accordance with a gain equivalent to that of the mechanical feedback system.

Another aspect of the present invention lies in providing a shift control system for a troidal continuously variable transmission provided with input and output discs and power rollers frictionally engaged with the input and output discs for ensuring power transmission therebetween, the shift control system serving to make, by opening a shift control valve in a neutral position in accordance with a shift command value, the power rollers be offset with respect to a position wherein a rotation axis thereof and a rotation axis of the input and output discs cross each other so as to produce tilting of the power rollers about an oscillating axis perpendicular to the rotation axis thereof and toward a target tilting angle corresponding to the shift command value, the shift control system serving to return the power rollers to the position by returning, when achieving the target tilting angle, the shift control valve to the neutral position through feedback of a tilting angle of the power rollers to the shift control valve via a mechanical feedback system, the shift control system comprising:

means for detecting a revolution of the output disc;

means for detecting a physical quantity indicative of a speed ratio of the troidal continuously variable transmission;

means for electronically feeding back, for calculation of the shift command value, a deviation of said physical quantity from a target value thereof corresponding to the target tilting angle in accordance with a predetermined gain;

means for detecting the tilting angle of the power rollers; and means for canceling, for calculation of the shift command value, a function of the mechanical feedback system through electronic feedback of the tilting angle as detected in accordance with a gain equivalent to that of the mechanical feedback system.

The other aspect of the present invention lies in providing, in a troidal continuously variable transmission:

input and output discs;

power rollers frictionally engaged with the input and output discs for ensuring power transmission therebetween; and a shift control system arranged to operate on said power rollers for ensuring shifting, said shift control system serving to make, by opening a shift control valve in a neutral position in accordance with a shift command value, said power rollers be offset with respect to a position wherein a rotation axis thereof and a rotation axis of said input and output discs cross each other so as to produce tilting of said power rollers about an oscillating axis perpendicular to said rotation axis thereof and toward a target tilting angle corresponding to said shift command value, said shift control system serving to return said power rollers to said position by returning, when achieving said target tilting angle, said shift control valve to said neutral position through feedback of a tilting angle of said power rollers to said shift control valve via a mechanical feedback system, said shift control system comprising:

means for detecting a revolution of said output disc;

means for detecting a physical quantity indicative of a speed ratio of the troidal continuously variable transmission;

an electronic feedback system arranged to feed back, for calculation of said shift command value, a deviation of said physical quantity from a target value thereof corresponding to said target tilting angle in accordance with a predetermined gain;

means for detecting said tilting angle of said power rollers; and a mechanical feedback function cancellation system arranged to cancel, for calculation of said shift command value, a function of said mechanical feedback system through electronic feedback of said tilting angle as detected in accordance with a gain equivalent to that of said mechanical feedback system.

DETAILED DESCRIPTION OF THE INVENTION

Figure 2:
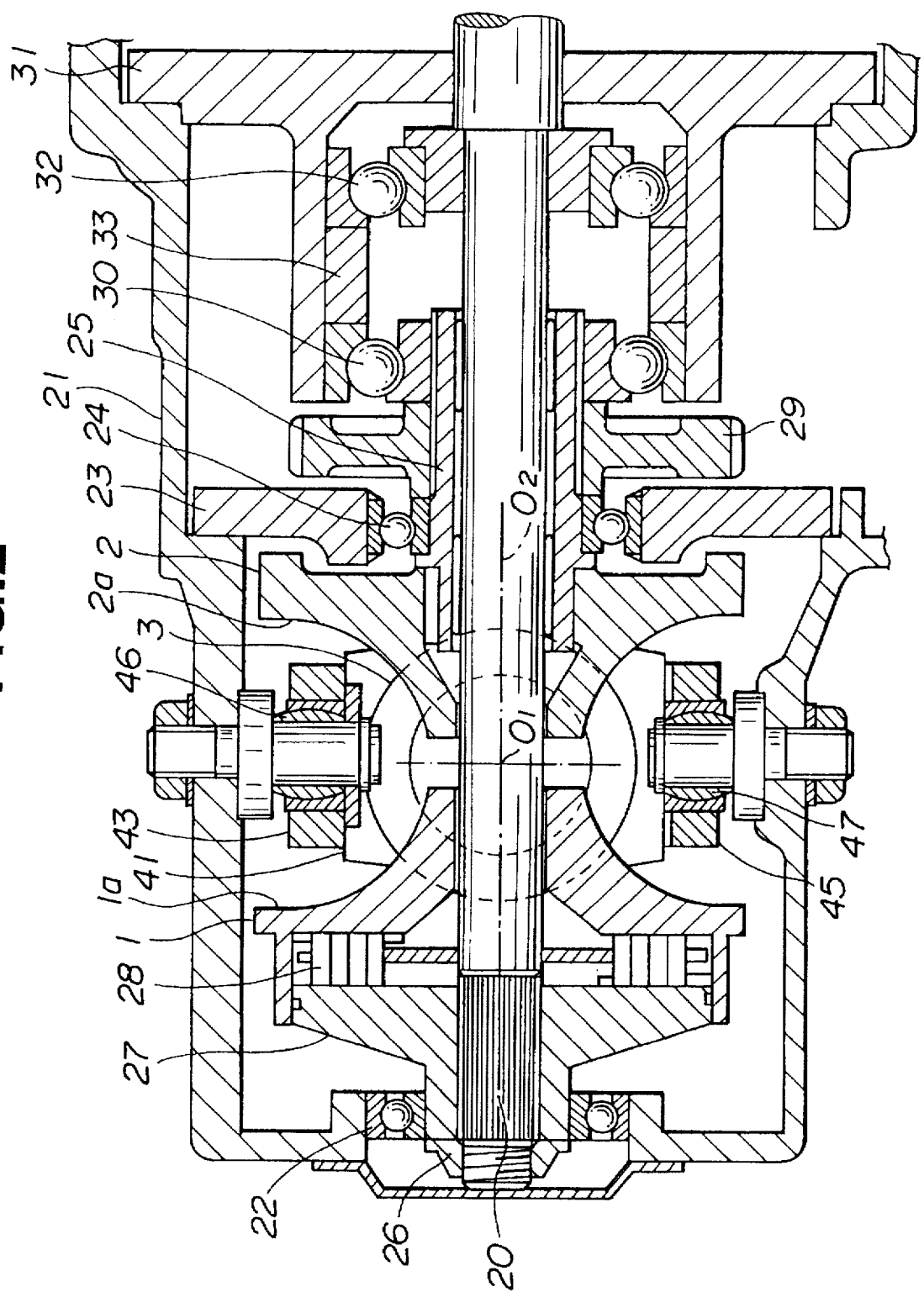
FIG. 2 is a longitudinal section showing a troidal continuously variable transmission to which the present invention is applied.
Figure 3:
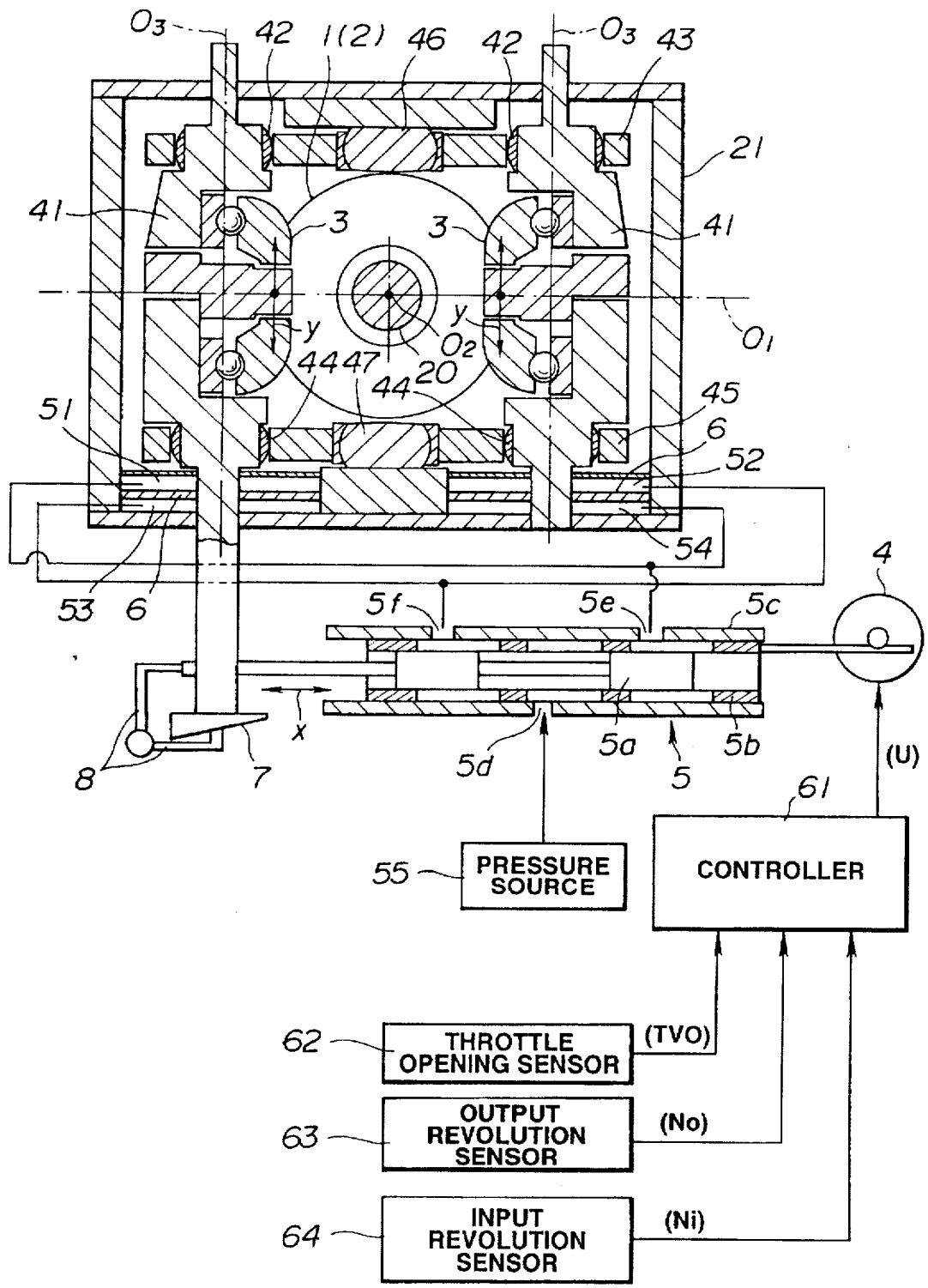
FIG. 3 is a cross section showing the troidal continuously variable transmission with the shift control system.

Referring first to FIGS. 2 and 3, generally, a troidal continuously variable transmission comprises a troidal transmission unit provided with an input shaft 20 which receives rotation que from an engine, not shown, and has an end portion which is distant from the engine and rotatably supported by a transmission casing 21 through a bearing 22, and a middle portion which is rotatably supported by an intermediate wall 23 of the transmission casing 21 through a bearing 24 and a hollow output shaft 25. Input and output discs 1, 2 are rotatably supported on the input shaft 20, and disposed so that troidal surfaces 1a, 2a are opposite to each other. A pair of power rollers 3 is interposed between the troidal surfaces 1a, 2a of the input and output discs 1, 2, and disposed opposite to each other across the input shaft 20. The following structure is adopted to hold the power rollers 3 between the input and output discs 1, 2:

A loading nut 26 is engaged with the end of the input shaft 20. A loading cam 28 is interposed between a cam disc 27 rotatably externally engaged with the input shaft 20 and stopped by the loading nut 26 and an end face of the input disc 1 distant from the troidal surface 1a so that rotation from the input shaft 20 to the cam disc 27 is transmitted to the input disc 1 through the loading cam 28. While rotation of the input disc 1 is transmitted to the output disc 2 through rotation of the power rollers 3, the loading cam 28 produces a thrust in proportion to transmitted torque so as to hold the power rollers 3 between the input and output discs 1, 2, enabling the above power transmission.

The output disc 2 is fixed on the output shaft 25, whereas an output gear 29 is externally engaged therewith for unitary rotation. Moreover, the output shaft 25 is rotatably supported by an end cover 31 of the transmission casing 21 through a radial-thrust bearing 30, and the input shaft 20 is also rotatably supported by the end cover 31 through a radial-thrust bearing 32. The radial-thrust bearings 30, 32 are abutted through a spacer 33 so as not to approach each other, and they contact the output gear 29 and the input shaft 20 axially so as not to have a relative displacement in the direction of separating from each other. Thus, a thrust of the loading cam 28 operating on the input and output discs 1, 2 becomes an internal force to hold the spacer 33, and fails to operate on the transmission casing 21.

As best seen in FIG. 3, each power roller 3 is rotatably supported by a trunnion 41 which has an upper end rotatably swingably connected to both ends of an upper link 43 through a spherical joint 42, and lower end rotatably swingably connected to both ends of a lower link 45 through a spherical link 44. The upper and lower links 43, 45 have a middle portion vertically swingably supported by the transmission casing 21 through spherical joints 46, 47, respectively, so as to vertically synchronously move the trunnions 41 in opposite directions.

Referring to FIG. 3, a description will be made with regard to a shift control system which ensures shifting by vertically synchronously moving the trunnions 41 in opposite directions. Each trunnion 41 is provided with a piston 6 for producing vertical strokes thereof, an upper chamber 51, 52 and a lower chamber 53, 54 being defined on both sides of the piston 6. A shift control valve 5 is arranged to ensure stroke control of the pistons 6 in opposite directions. The shift control valve 5 is provided with a spool-type inner valve element 5a and a sleeve-type outer valve element 5b which are slidably engaged with each other, the outer valve element 5b being slidably engaged with an outer valve casing 5c.

The shift control valve 5 has an input port 5d connected to a pressure source 55, and one communication port 5e connected to the piston chambers 51, 54, and another communication port 5f connected to the piston chambers 52, 53. The inner valve element 5a cooperates with a cam face of a precess cam 7 fixed to the lower end of one trunnion 41 through a bell-crank-type shift link 8 to drivingly engage the outer valve element 5b with an actuator or a stepper motor 4 through a rack and pinion.

An operation command of the shift control valve 5 in the form of a stroke of the actuator 4 driven in accordance with a shift command value U is provided to the outer valve element 5b through the rack and pinion. When the outer valve element 5b is displaced from a neutral position to, e.g. a position as shown in FIG. 3 relative to the inner valve element 5a by the operation command, the piston chambers 52, 53 receive a fluid pressure from the pressure source 55, whereas the other piston chambers 51, 54 are drained. On the other hand, when the outer valve element 5b is displaced from the neutral position to a position opposite to that as shown in FIG. 2 relative to the inner valve element 5a, the piston chambers 51, 54 receives a fluid pressure from the pressure source 55, whereas the piston chambers 52, 53 are drained. Thus, the trunnions 41 are hydraulically vertically displaced in opposite directions as viewed in FIG. 3 through the pistons 6. By this, the power rollers 3 are offset by y with respect to a position as shown in FIG. 3 wherein a rotation axis $O_1$ thereof and a rotation axis $O_2$ of the input and output discs 1, 2 cross each other, which produces tilting of the power rollers 3 by $\phi$ about an oscillating axis $O_3$ perpendicular to the rotation axis $O_1$ due to an oscillating component force out of the input and output discs 1, 2, enabling continuous shifting.

Figure 1:
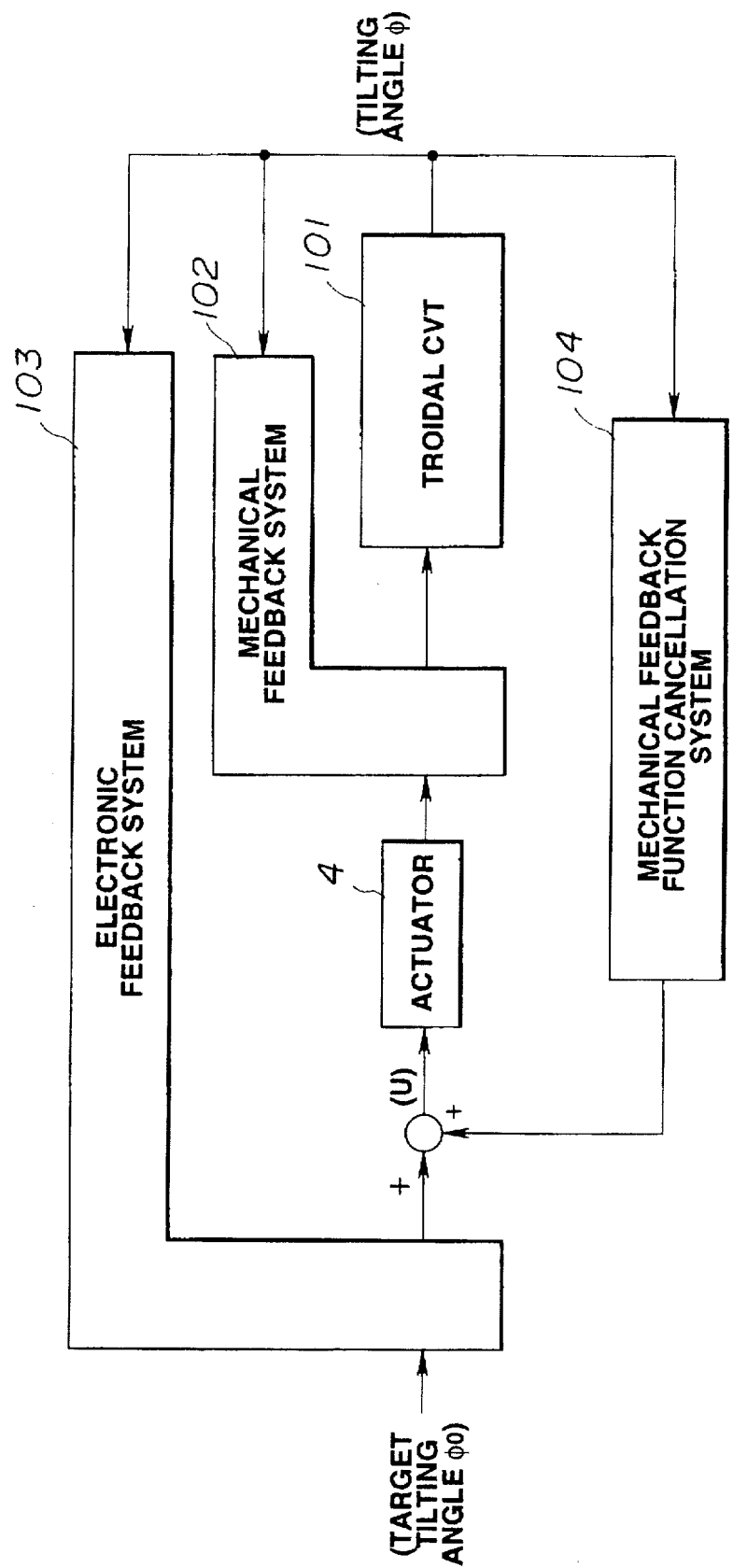
FIG. 1 is a block diagram showing a general structure of a shift control system for a troidal continuously variable transmission according to the present invention.

Referring to FIG. 1, the troidal continuously variable transmission 101 is constructed as described above.

During such shifting, the precess cam 7 connected to the lower end of one trunnion 41 feeds back mechanically to the inner valve element 5a of the shift control valve 5 the above vertical movement or an offset amount y of the trunnions 41 and the power rollers 3, and the tilting angle $\phi$ through the shift link 8. When achieving the shift command value U to the actuator 4 through the above continuous shifting, the mechanical feedback via the precess cam 7 makes the inner valve element 5a of the shift control valve 5 return to the initial neutral position relative to the outer valve element 5b, and at the same time, the power rollers 3 are returned to the position as shown in FIG. 3 wherein the rotation axis $O_1$ thereof and the rotation axis $O_2$ of the input and output discs 1, 2 cross each other, enabling maintaining of the shift command value as achieved. Thus, referring to FIG. 1, the precess cam 7 and the shift link 8 constitute a mechanical feedback system 102.

Since control aims to set the power roller tilting angle $\phi$ to a value corresponding to a target speed ratio, the precess cam 7 needs only to feed back the power roller tilting angle $\phi$, in principle. The reason why not only the power roller tilting angle φ, but the power roller offset amount y are fed back is to obtain a damping effect for preventing vibratile shift control, and thus avoid a hunting phenomenon of shift control.

Figure 4:
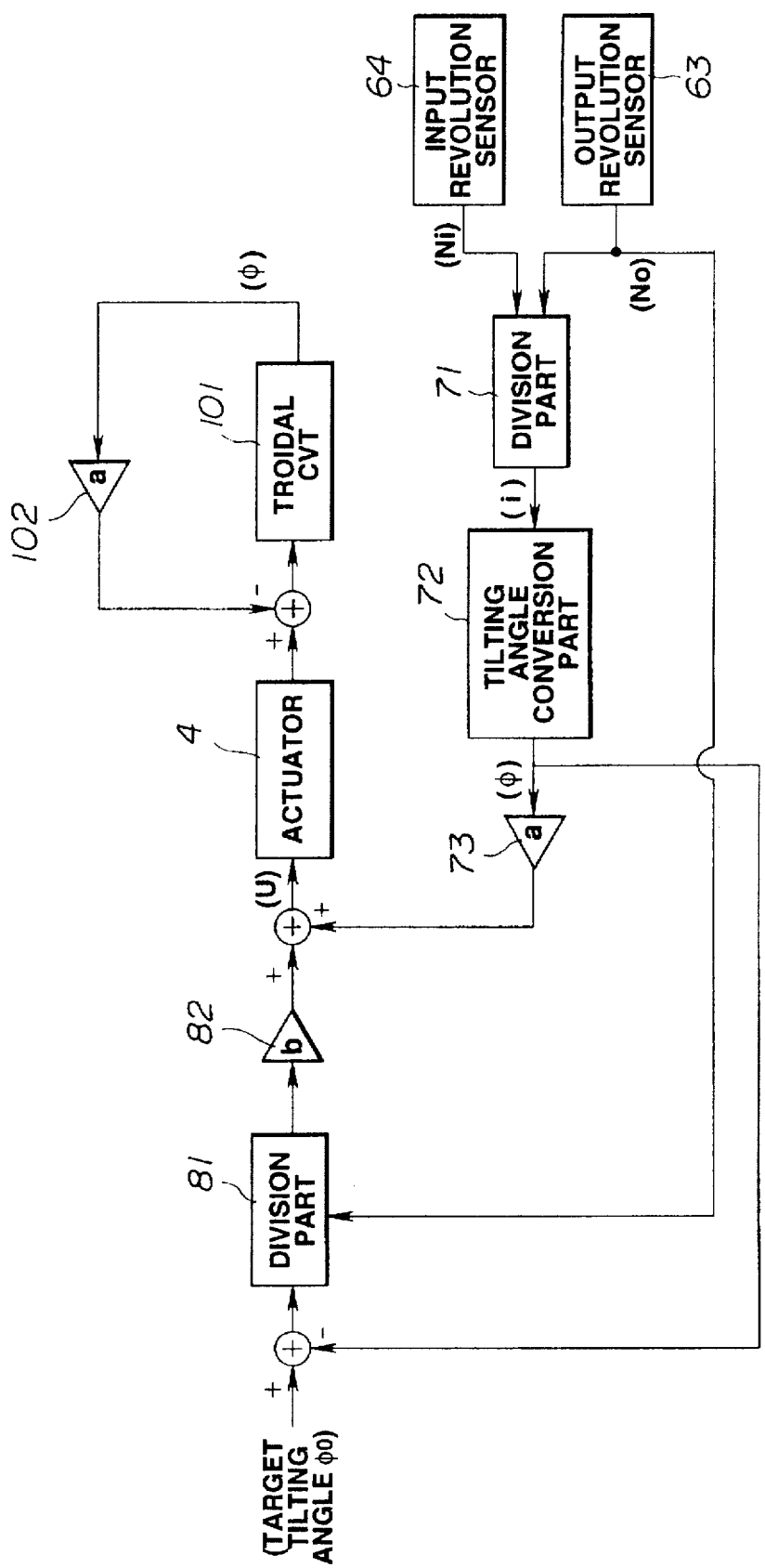
FIG. 4 is a view similar to FIG. 1, showing one preferred embodiment of the shift control system.

The shift command value U provided to the actuator 4 is determined by a controller 61 to which are input a signal out of a throttle opening sensor 62 for detecting an engine throttle opening degree TVO, a signal out of an output revolution sensor 63 for detecting a revolution $N_o$ of the output disc 2 which corresponds to output disc revolution detecting means, and a signal out of an input revolution sensor 64 for detecting a revolution $N_i$ of the input disc 1 which may be replaced with an engine revolution $N_o$. The controller 61 determines the shift command value U provided to the actuator 4 based on such input information and in accordance with the following operation:

Referring to FIG. 4, according to this embodiment, for obtaining the structure of the shift control system as shown in FIG. 1, i.e. adding an electronic feedback system 103 and a mechanical feedback function cancellation system 104 to the troidal continuously variable transmission 101 and a mechanical feedback system 102, the controller 61 is constructed as shown in FIG. 4. It is noted that FIG. 4 shows only a feedback of the power roller tilting angle φ for simplification, a feedback gain of the mechanical feedback system 102 being given by a.

The controller 61 includes a division part 71, a tilting angle conversion part 72 which corresponds to physical quantity detecting means and tilting angle detecting means, and a signal multiplication part 73 which constitute the mechanical feedback function cancellation system 104. Additionally, the controller 61 includes a division part 81 and a signal multiplication part 82, which constitute the electronic feedback system 103.

The division part 71 calculates a speed ratio i given by a ratio $N_i/N_o$ of a revolution $N_i$ of the input disc 1 detected by the input revolution sensor 64 to a revolution $N_o$ of the output disc 2 detected by the output revolution sensor 63, out of which the tilting angle conversion part 72 determines a power roller tilting angle φ. The signal multiplication part 73 multiplies the power roller tilting angle φ out of the tilting angle conversion part 72 in accordance with a gain a identical to that of the mechanical feedback system 102, which is positively fed back for calculation of the shift command value U.

The division part 81 divides a division $\phi_o-\phi$ of the power roller tilting angle φ from a target tilting angle $\phi_o$ (one of physical quantities indicative of a deviation of a speed ratio from a target speed ratio) out of the tilting angle conversion part 72 by the output disc revolution $N_o$ detected by the output revolution sensor 63, which is multiplied in the signal multiplication part 82 in accordance with a gain b, which is fed back for calculation of the shift command value U, the feedback amount being given by the formula (6).

As for determination of the target power roller tilting angle $\phi_o$, the controller 61 determines a target revolution of the input disc 1 out of the vehicle speed in accordance with the throttle opening degree TVO detected by the throttle opening sensor 62 and the output disc revolution $N_o$ detected by the output revolution sensor 63 and based on a shift map as previously stored in a memory, then, calculates the target power roller tilting angle $\phi_o$ out of the target input disc revolution and the output disc revolution $N_o$.

The shift command value U is obtained by adding the two feedback amounts, i.e. a×φ out of the signal multiplication part 73 and $(\phi_o-\phi)\cdot b/N_o$ out of the signal multiplication part 82. Since the feedback amount a×φ out of the signal multiplication part 73 and the feedback amount of the mechanical feedback system 102 have the opposite polarity and the same value, the mechanical feedback function cancellation system 104 comprising the division part 71, the tilting angle conversion part 72, and the signal multiplication part 73 serves to fully cancel the function of the mechanical feedback system 102 even if it exists, and the electronic feedback system 103 comprising the division part 81 and the signal multiplication part 82 ensures shift control equivalent to that with no mechanical feedback system 102.

Shift control ensured by the electronic feedback system 103 will be considered. This shift control produces a feedback given by the formula (6), i.e. a feedback of the power roller tilting angle φ with a gain $b/N_o$ proportional to an inverse number of the output disc revolution $N_o$. As a result, as seen from the formulae (7) and (8), a desired characteristic of shifting can be maintained irrelevant to the output disc revolution $N_o$, i.e. over all vehicle speed area.

Even though the mechanical feedback system 102 is kept for fail safe, its function is fully cancelled by the mechanical feedback function cancellation system 104 comprising the tilting angle conversion part 72 and the signal multiplication part 73 as described above, obtaining a shift control system which can avoid the aforementioned problem produced when the mechanical feedback system 102 exists, i.e. the problem that the characteristic of shifting is varied with the output disc revolution $N_o$ or the vehicle speed.

In this embodiment, when the mechanical feedback function cancellation system 104 comprising the division part 71, the tilting angle conversion part 72, and the signal multiplication part 73 operates normally, the electronic feedback system 103 comprising the division part 81 and the signal multiplication part 82 can malfunction. In that case, the mechanical feedback function cancellation system 104 serves to cancel the function of the mechanical feedback system 102, so that feedback control is not ensured by the mechanical feedback system 102. Additionally, feedback control is not ensured by the electronic feedback system 13 which malfunctions, resulting in unstable shifting of the troidal continuously variable transmission 101.

Figure 5:
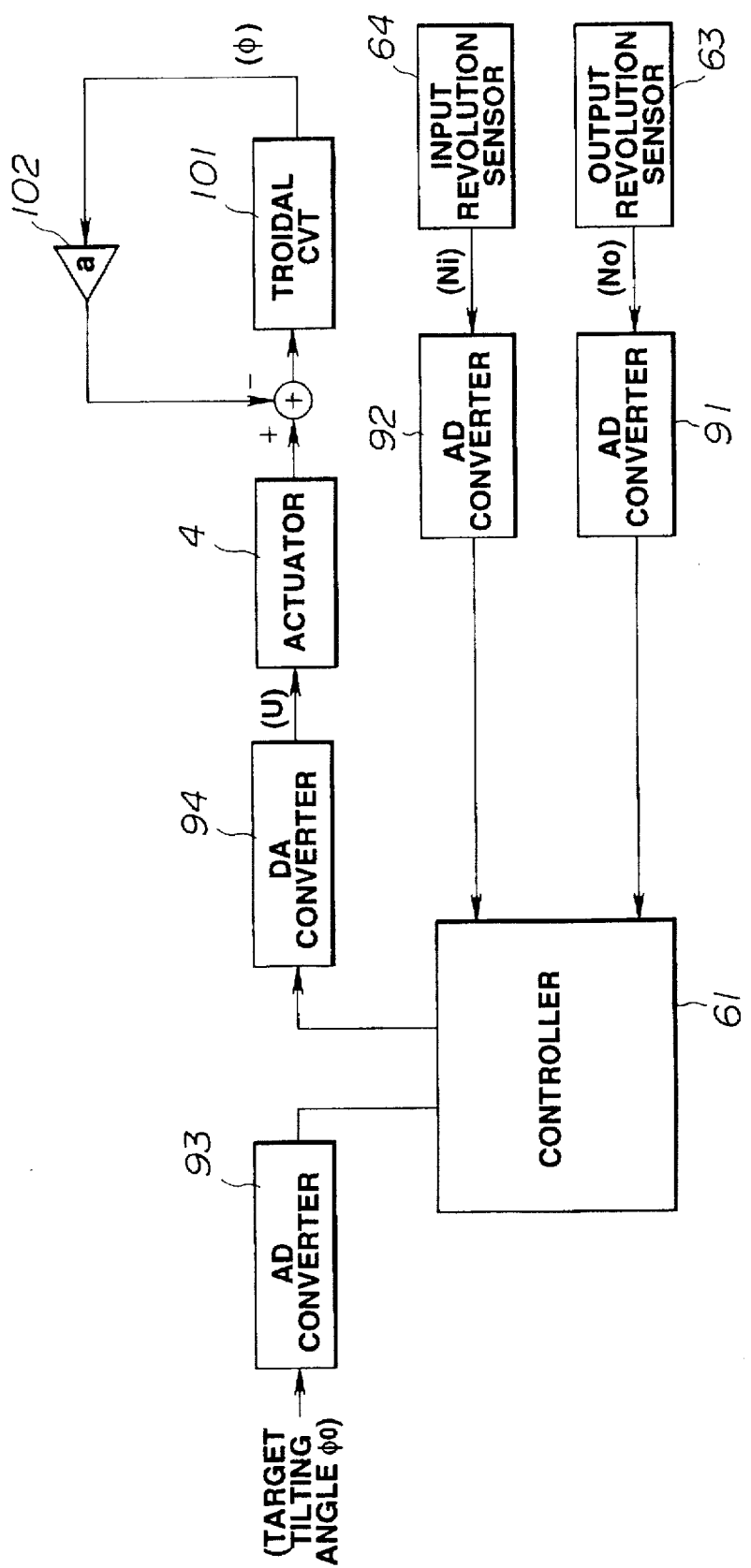
FIG. 5 is a view similar to FIG. 4, showing another preferred embodiment of the present invention.

FIG. 5 shows another embodiment of the present invention which can avoid such unstable shifting of troidal continuously variable transmission 101. In this embodiment, the controller 61 comprises a single control unit such as a microcomputer. With the controller 61 in the form of a microcomputer, before inputting to the controller 61 analog signals of the input and output disc revolutions $N_i$, $N_o$ from the input and output revolution sensors 64, 63, analog-to-digital (AD) converters 91, 92 convert the analog signals to digital signals. Likewise, before inputting thereto an analog signal of the target tilting angle $\phi_o$, the analog-to-digital (AD) converter 93 converts the analog signal to a digital signal. Moreover, the shift command value U provided to the actuator 4 is converted to an analog signal by a digital-to-analog (DA) converter 94.

Figure 6:
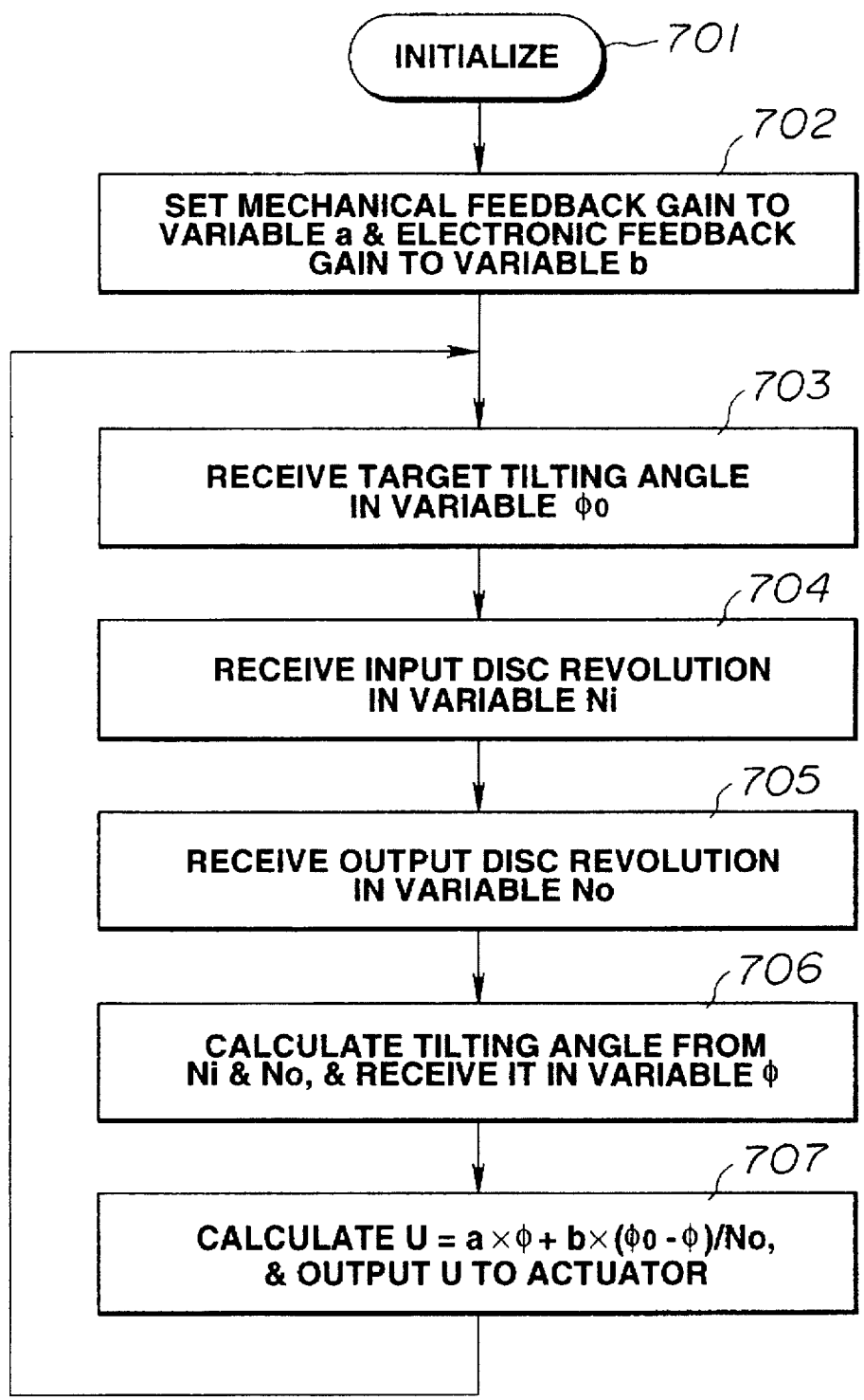
FIG. 6 is a flowchart showing a program for determining a shift command value.

Referring to FIG. 6, the controller 61 executes a control program based on the above input information to ensure the same feedback shift control as in the preceding embodiment. Specifically, at a step 701, the microcomputer is initialized. At a subsequent step 702, the feedback gain of the mechanical feedback system 102 is set to a variable a, whereas an electronic feedback gain for achieving a desired transient characteristic of shifting is set to a variable b, this gain being identical to the gain of the electronic feedback system 103 in the preceding embodiment.

At a step 703, the target tilting angle is received in a variable $\phi_o$. At a step 704, the input disc revolution is received in a variable $N_i$, whereas at a step 705, the output disc revolution is received in a variable $N_o$. At a subsequent step 706, the power roller tilting angle is determined through the same processing as that carried out by the division part 71 and the tilting angle conversion part 72 as shown in FIG. 4, i.e. out of the ratio $N_i/N_o$ of the input disc revolution $N_i$ to the output disc revolution $N_o$, which is received in a variable $\phi$. At a step 707, the shift command value U is calculated by a formula:

$$U = a \cdot \phi + (b/N_o)(\phi_o - \phi) \qquad (12)$$

which is provided to the actuator 4, then, control is returned to the step 703.

According to this embodiment, also, the shift command value U provided to the actuator 4 is identical to that as given in connection with FIG. 4, achieving the same effect as in the preceding embodiment. Moreover, according to this embodiment, the single microcomputer 61 ensures the same calculation as that the electronic feedback system 103 and the mechanical feedback system 104 ensure, so that when breaking down to fail to carry out the same calculation as that the electronic feedback system 103 carries out, the microcomputer 61 fails to ensure the same calculation as that the mechanical feedback system 104 ensures.

Thus, the function of the mechanical feedback system 102 cannot be cancelled due to calculation of the latter in spite of no calculation of the former, avoiding unstable shift control of the troidal continuously variable transmission 101 with quite ineffective feedback.

Figure 7:
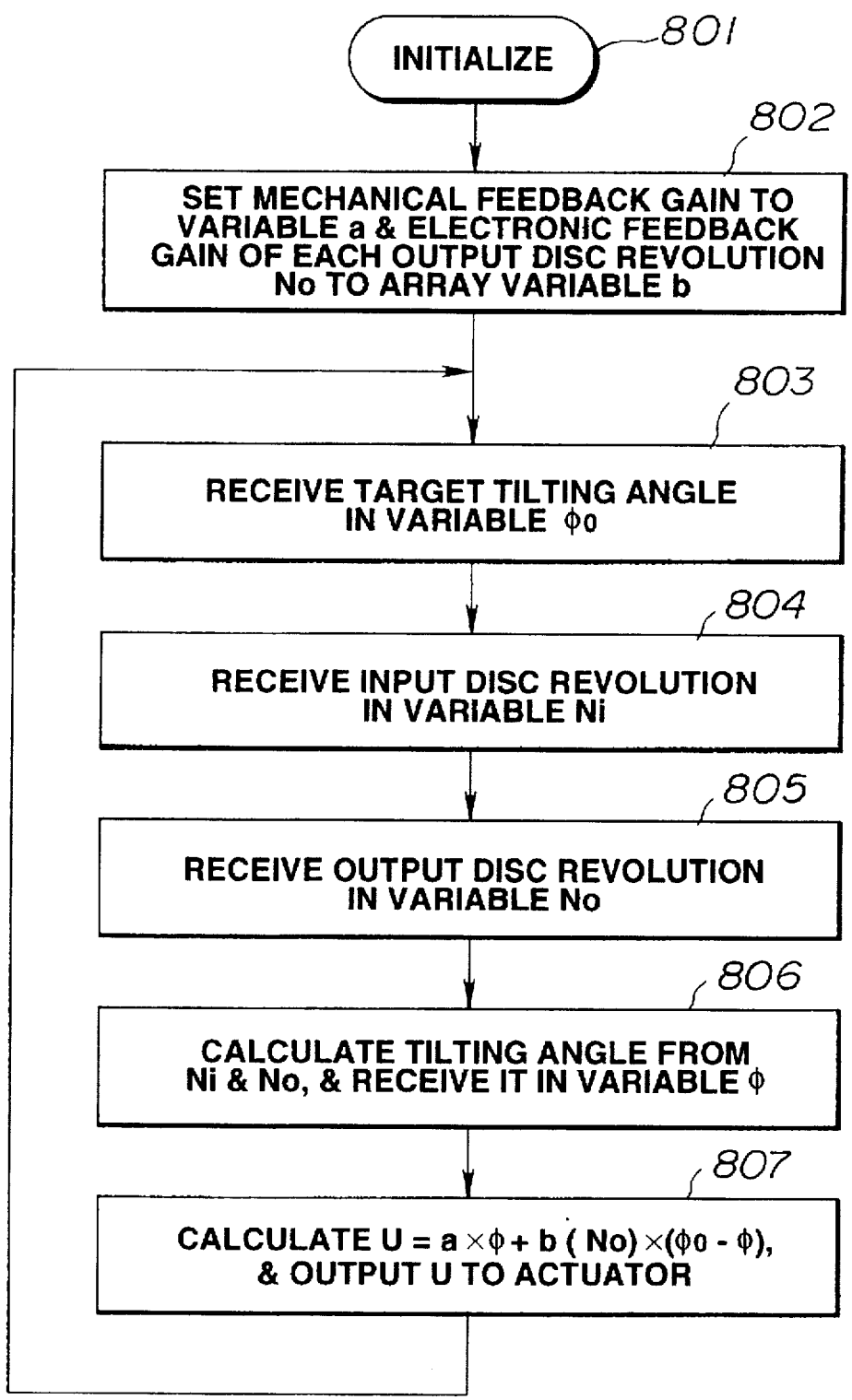
FIG. 7 is a view similar to FIG. 6, showing one variant of the program in FIG. 6.
Figure 8:
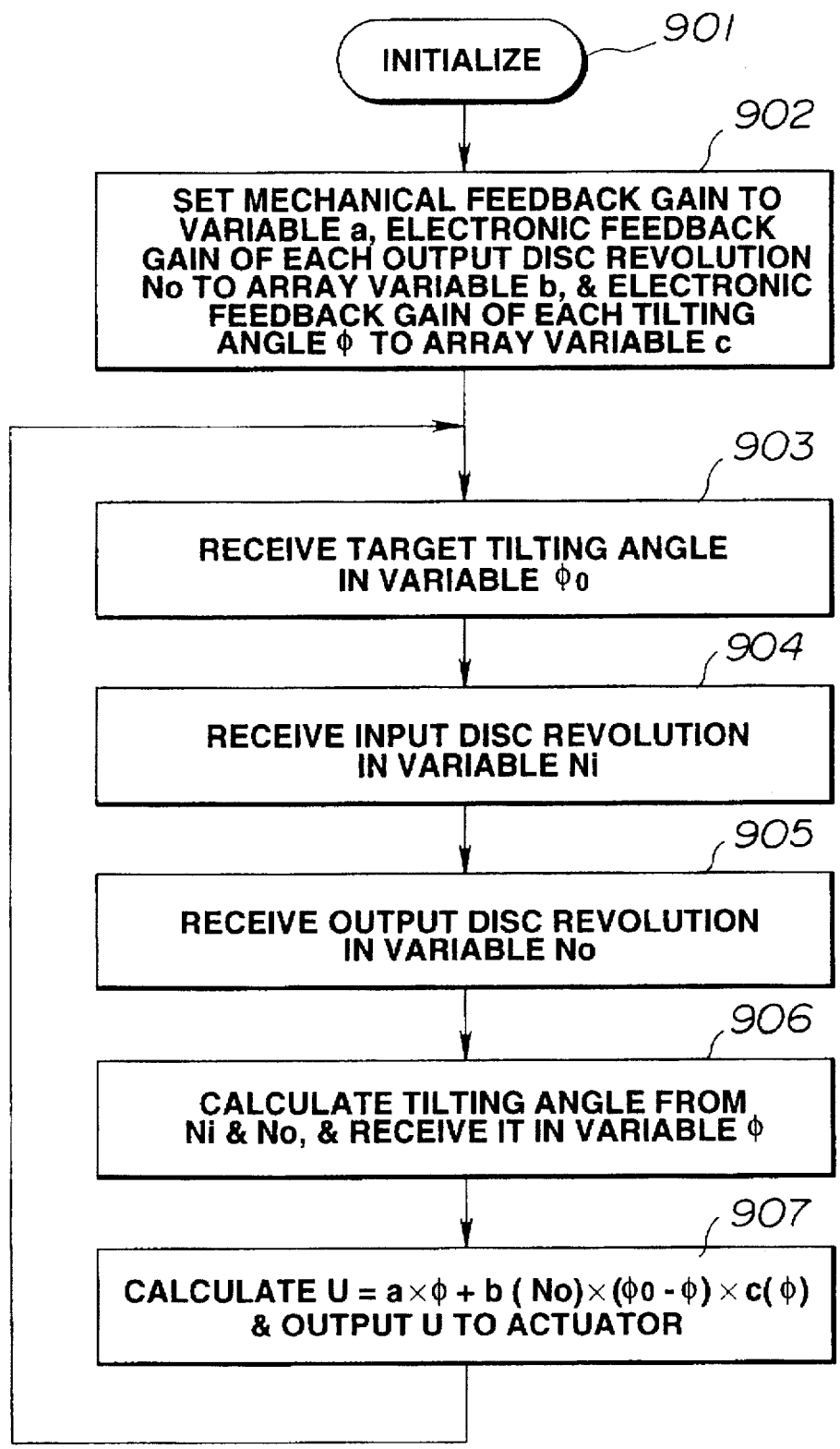
FIG. 8 is a view similar to FIG. 7, showing another variant of the program in FIG. 6.

FIGS. 7 and 8 show variants of the control program as shown in FIG. 6.

With the variant as shown in FIG. 7, at a step 801, the microcomputer is initialized. At a subsequent step 802, the feedback gain of the mechanical feedback system 102 is set to the variable a, whereas the electronic feedback gain of each output disc revolution $N_o$ for achieving a desired transient characteristic of shifting is set to the variable b which is an array variable in this variant. As for the electronic feedback gain of each output disc revolution $N_o$, an actual shift operation of the troidal continuously variable transmission 101 is experimentally determined, based on which the electronic feedback gain is obtained as experimental data which is stored in the memory.

At a step 803, the target tilting angle is received in the variable $\phi_o$. At a step 804, the input disc revolution is received in the variable $N_i$, whereas at a step 805, the output disc revolution is received in the variable $N_o$. At a subsequent step 806, the power roller tilting angle is determined through the same processing as that carried out by the division part 71 and the tilting angle conversion part 72 as shown in FIG. 4, i.e. out of the ratio $N_i/N_o$ of the input disc revolution $N_i$ to the output disc revolution $N_o$, which is received in the variable $\phi$. At a step 807, a variable $b(N_o)$ corresponding to the output disc revolution $N_o$ is retrieved from the array variable b, with which the shift command value U is calculated by a formula:

$$U = a \cdot \phi + b(N_o) \cdot (\phi_o - \phi) \qquad (13)$$

which is provided to the actuator 4, then, control is returned to the step 803.

In this variant, the electronic feedback amount is $b(N_o) \cdot (\phi_o - \phi)$ in place of $(b/N_o)(\phi_o - \phi)$ as seen in FIG. 6. In that case, even when the shift operation of the troidal continuously variable transmission 101 is not approximated by the formula (2), the electronic feedback amount can be adjusted in accordance with an actual shift operation, resulting in further ensured effect of keeping constant a desired characteristic of shifting irrespective of the vehicle speed in comparison with the above embodiments.

With the variant as shown in FIG. 8, at a step 901, the microcomputer is initialized. At a subsequent step 902, the feedback gain of the mechanical feedback system 102 is set to the variable a, and the electronic feedback gain of each output disc revolution $N_o$ for achieving a desired transient characteristic of shifting is set to the array variable b, and the electronic feedback gain in response to the power roller tilting angle $\phi$ is set to an array variable c. As for the electronic feedback gain in response to the power roller tilting angle $\phi$, an appropriate value is experimentally determined for each power roller tilting angle $\phi$, which is stored in the memory so as to correspond to each power roller tilting angle $\phi$.

At a step 903, the target tilting angle is received in the variable $\phi_o$. At a step 904, the input disc revolution is received in the variable $N_i$, whereas at a step 905, the output disc revolution is received in the variable $N_o$. At a subsequent step 906, the power roller tilting angle is determined through the same processing as that carried out by the division part 71 and the tilting angle conversion part 72 as shown in FIG. 4, i.e. out of the ratio $N_i/N_o$ of the input disc revolution $N_i$ to the output disc revolution $N_o$, which is received in the variable $\phi$. At a step 907, the variable $b(N_o)$ corresponding to the output disc revolution $N_o$ is retrieved from the array variable b, whereas a variable $c(\phi)$ corresponding to the power roller tilting angle $\phi$ is retrieved from the array variable c, with which the shift command value U is calculated by a formula:

$$U = a \cdot \phi + b(N_o) \cdot (\phi_o - \phi) \cdot c(\phi) \qquad (14)$$

which is provided to the actuator 4, then, control is returned to the step 903.

The above embodiments propose feedback control corresponding to the shift operation of the troidal continuously variable transmission 101 as linearly approximated by the formula (2). On the other hand, this variant proposes feedback control corresponding to the shift operation of the troidal continuously variable transmission 101 as regarded as nonlinear characteristic given by the formula (1). As a result, this variant enables not only feedback control in accordance with the output disc revolution $N_o$, but feedback control in accordance with the power roller tilting angle $\phi$, achieving, in addition to the effect of the variant as shown in FIG. 7, the effect of keeping constant a desired characteristic of shifting irrespective of the power roller tilting angle $\phi$.

Having described the present invention in connection with the preferred embodiments, it is noted that the present invention is not limited thereto, and various changes and modifications can be made without departing from the spirit of the present invention. By way of example, when applying the troidal continuously variable transmission 101 to a motor vehicle, the characteristic of shifting may be determined by manually changing the electronic feedback gain at choice.

What is claimed is:

1. A shift control system for a troidal continuously variable transmission provided with input and output discs and power rollers frictionally engaged with the input and output discs for ensuring power transmission therebetween, the shift control system serving to make, by opening a shift control valve in a neutral position in accordance with a shift command value, the power rollers be offset with respect to a position wherein a rotation axis thereof and a rotation axis of the input and output discs cross each other so as to produce tilting of the power rollers about an oscillating axis perpendicular to the rotation axis thereof and toward a target tilting angle corresponding to the shift command value, the shift control system serving to return the power rollers to the position by returning, when achieving the target tilting angle, the shift control valve to the neutral position through feedback of a tilting angle of the power rollers to the shift control valve via a mechanical feedback system, the shift control system comprising:

means for detecting a revolution of the output disc;

means for detecting a physical quantity indicative of a speed ratio of the troidal continuously variable transmission;

an electronic feedback system arranged to feed back, for calculation of the shift command value, a deviation of said physical quantity from a target value thereof corresponding to the target tilting angle in accordance with a predetermined gain;

means for detecting the tilting angle of the power rollers; and a mechanical feedback function cancellation system arranged to cancel, for calculation of the shift command value, a function of the mechanical feedback system through electronic feedback of the tilting angle as detected in accordance with a gain equivalent to that of the mechanical feedback system.

2. A shift control system as claimed in claim 1, wherein said predetermined gain is proportional to an inverse number of said revolution of the output disc as detected.

3. A shift control system as claimed in claim 2, wherein said predetermined gain is experimentally determined for each revolution of the output disc.

4. A shift control system as claimed in claim 3, wherein said predetermined gain is changed in accordance with the tilting angle of the power rollers as detected.

5. A shift control system as claimed in claim 1, wherein said electronic feedback system is correlated with said mechanical feedback function cancellation system so that when said electronic feedback system malfunctions, said mechanical feedback function cancellation system fails to operate.

6. A shift control system for a troidal continuously variable transmission provided with input and output discs and power rollers frictionally engaged with the input and output discs for ensuring power transmission therebetween, the shift control system serving to make, by opening a shift control valve in a neutral position in accordance with a shift command value, the power rollers be offset with respect to a position wherein a rotation axis thereof and a rotation axis of the input and output discs cross each other so as to produce tilting of the power rollers about an oscillating axis perpendicular to the rotation axis thereof and toward a target tilting angle corresponding to the shift command value, the shift control system serving to return the power rollers to the position by returning, when achieving the target tilting angle, the shift control valve to the neutral position through feedback of a tilting angle of the power rollers to the shift control valve via a mechanical feedback system, the shift control system comprising:

means for detecting a revolution of the output disc;

means for detecting a physical quantity indicative of a speed ratio of the troidal continuously variable transmission;

means for electronically feeding back, for calculation of the shift command value, a deviation of said physical quantity from a target value thereof corresponding to the target tilting angle in accordance with a predetermined gain;

means for detecting the tilting angle of the power rollers; and means for canceling, for calculation of the shift command value, a function of the mechanical feedback system through electronic feedback of the tilting angle as detected in accordance with a gain equivalent to that of the mechanical feedback system.

7. In a troidal continuously variable transmission:

input and output discs;

power rollers frictionally engaged with the input and output discs for ensuring power transmission therebetween; and a shift control system arranged to operate on said power rollers for ensuring shifting, said shift control system serving to make, by opening a shift control valve in a neutral position in accordance with a shift command value, said power rollers be offset with respect to a position wherein a rotation axis thereof and a rotation axis of said input and output discs cross each other so as to produce tilting of said power rollers about an oscillating axis perpendicular to said rotation axis thereof and toward a target tilting angle corresponding to said shift command value, said shift control system serving to return said power rollers to said position by returning, when achieving said target tilting angle, said shift control valve to said neutral position through feedback of a tilting angle of said power rollers to said shift control valve via a mechanical feedback system, said shift control system comprising:

means for detecting a revolution of said output disc;

means for detecting a physical quantity indicative of a speed ratio of the troidal continuously variable transmission;

an electronic feedback system arranged to feed back, for calculation of said shift command value, a deviation of said physical quantity from a target value thereof corresponding to said target tilting angle in accordance with a predetermined gain;

means for detecting said tilting angle of said power rollers; and a mechanical feedback function cancellation system arranged to cancel, for calculation of said shift command value, a function of said mechanical feedback system through electronic feedback of said tilting angle as detected in accordance with a gain equivalent to that of said mechanical feedback system.

* * * * *